US008864578B2

(12) United States Patent
Bennett, III et al.

(10) Patent No.: US 8,864,578 B2
(45) Date of Patent: Oct. 21, 2014

(54) METHODS FOR SECURE GAME ENTRY GENERATION VIA MULTI-PART GENERATION SEEDS

(71) Applicant: Scientific Games International, Inc., Newark, DE (US)

(72) Inventors: Joseph B. Bennett, III, Suwanee, GA (US); Christopher Garnet Akins, Flowery Branch, GA (US); Ashley Ivery Gantt, Woodstock, GA (US)

(73) Assignee: Scientific Games International, Inc., Newark, DE (US)

( * ) Notice: Subject to any disclaimer, the term of this patent is extended or adjusted under 35 U.S.C. 154(b) by 197 days.

(21) Appl. No.: 13/645,844

(22) Filed: Oct. 5, 2012

(65) Prior Publication Data

US 2014/0100014 A1 Apr. 10, 2014

(51) Int. Cl.
*G06F 17/00* (2006.01)
*G06F 19/00* (2011.01)

(52) U.S. Cl.
USPC .............................................. 463/29; 463/17

(58) Field of Classification Search
USPC ................ 463/1, 16–20, 29, 40–42; 708/254; 380/251
See application file for complete search history.

(56) References Cited

U.S. PATENT DOCUMENTS 4,191,376 A 3/1980 Goldman et al.
4,398,708 A 8/1983 Goldman et al.
4,463,250 A 7/1984 McNeight et al.
4,582,324 A * 4/1986 Koza et al. ...................... 463/16
4,858,123 A 8/1989 Alexoff et al.
4,871,172 A 10/1989 Hwang
5,779,545 A * 7/1998 Berg et al. ....................... 463/22
5,935,000 A 8/1999 Sanchez, III et al.
5,949,042 A 9/1999 Dietz, II et al.
6,030,288 A * 2/2000 Davis et al. ..................... 463/29
6,477,251 B1 * 11/2002 Szrek et al. ..................... 380/46
6,533,664 B1 * 3/2003 Crumby .......................... 463/42
6,752,319 B2 6/2004 Ehrhart et al.
6,885,747 B1 * 4/2005 Scheidt et al. ................ 713/185
7,155,014 B1 * 12/2006 Hamman et al. .............. 380/251
8,043,154 B2 10/2011 Bennett, III
2004/0056416 A1 * 3/2004 Bennett, III ................... 273/269
2004/0166921 A1 * 8/2004 Michaelson .................... 463/20
2004/0166923 A1 * 8/2004 Michaelson et al. ............ 463/20
2005/0221889 A1 * 10/2005 Dupray et al. .................. 463/29
2006/0104443 A1 5/2006 Chari et al.
2010/0120497 A1 * 5/2010 Weber et al. .................... 463/20
2010/0203960 A1 * 8/2010 Wilson et al. ................... 463/29
2010/0285865 A1 11/2010 Enzminger
2010/0311496 A1 * 12/2010 Taylor et al. .................... 463/25
2012/0283010 A1 * 11/2012 Koerkel et al. .................. 463/29

OTHER PUBLICATIONS

PCT Search Repart, Jan. 30, 2014.

* cited by examiner

*Primary Examiner* — Milap Shah
(74) *Attorney, Agent, or Firm* — Dority & Manning, P.A.

(57) ABSTRACT

Methods and systems for securely generating lottery games are presented. A final game generation seed number is formed from multiple seed numbers from multiple and differing parties such that no one party has the ability to create the final seed number without the other parties' consent or knowledge. Since the final seed number is required by the software that governs the distribution of prizes within a game and is therefore required to produce valid game data, no one entity would have enough information to determine the location of a winning prize. This creates an environment of transparency such that all parties must agree on the terms that result in the formation of the final seed number from the individual seed number fragments in order to produce a game.

18 Claims, 8 Drawing Sheets

METHODS FOR SECURE GAME ENTRY GENERATION VIA MULTI-PART GENERATION SEEDS

BACKGROUND

In most instant lottery ticket games, a set of tickets is imaged with play or prize value indicia under a scratch-off coating according to a predetermined prize structure. Typically, the prize structure consists of one or more large value prizes, a number of lesser value prizes and a large number of tickets that are not prize winners. The prize values in a game are distributed within the ticket population so that, in theory, each player has an equal chance to win one of the prizes. In the United States, lottery game providers typically produce lottery games that are divided up into pools where each pool has a prize structure. Each pool is then divided into a number of packs where each pack contains a preset number of lottery tickets. For example, a game might have several million tickets where each pool contains 240,000 tickets and each pool contains 800 books of 300 tickets. However, games can be organized in different ways and can, for example, consist of a set of packs not grouped into pools. Usually each individual pack of tickets, also termed books, is packaged by the game provider for delivery to the lottery administration or lottery sales agents.

The term “image” is a term that is commonly used by lottery ticket manufactures or game providers to indicate a system whereby variable indicia including ticket symbols such as play indicia and validation numbers are transferred onto the individual instant ticket as opposed to, for example, display printing which is the typical method of applying a common graphic to all the tickets in a game. Although these symbols are not technically printed on the ticket, it is common to use the terms imaged and printed interchangeably. This disclosure, as described below, is independent of whether symbols are imaged or printed.

Traditional instant ticket games are manufactured in the following manner: the lottery administration and the game provider design the game, game programmers and auditors create, test and approve instant ticket game software that is capable of accurately producing the game data file for a specific game.

The approved game software is transferred to a secured game production system where the software executes and produces the live instant ticket ‘game data file’. The file is encrypted and stored until press time at which time proprietary ink and lower security coatings are first applied to the paper, the game data is securely transferred to the paper using high-speed imaging systems and finally other inks and upper coatings are added to the paper to cover the game data and create an attractive ticket image.

These games are very popular and billions of tickets are sold annually. Traditional instant ticket games are games in which the winning and losing tickets are securely shuffled within the ‘game data file’. Such traditional instant ticket games are designated as ‘predetermined’ games because the game’s data is created prior to a player choosing to purchase a ticket. In these games, software and algorithms that use a Random Number Generator (RNG) determine which tickets win a prize and which do not. In other types of games, the value of the ticket is determined when the player purchases a ticket; or the value of the ticket may be determined after the player makes some choice during the play of the game; or the value of the ticket is determined based on some other criteria or trigger.

In all cases, some form of game software or game hardware, using an RNG, must determine which tickets win and at what level they win. For the discussion of the present disclosure, it does not matter if the game is designated as ‘predetermined’ or not. The disclosure applies to all types of games that use an RNG to shuffle winners and losers or otherwise determine the value of a ticket purchased by a player regardless of whether the RNG is used to pre-determine the value of the ticket before the player purchases a ticket or determine the value of the ticket real-time during the actual play of the ticket.

The game data is primarily presented to the player in the form of game symbols—numbers, letters or other common symbols—used in combinations that create familiar or new types of games that are entertaining and offer some mechanism to determine if the player has chosen or purchased a winning or a losing ticket. Some games are games where numbers are compared to other numbers; some games are symbols compared to other symbols but in general the game symbols would be familiar just as card symbols or tic-tac-toe symbols are familiar and are used to entertain players as they play the games as well as, or more importantly, to indicate to the player whether or not the player’s ticket is a winning ticket. This is comparable to a hand of cards that entertain the player but would also indicate that one player has won the hand over another player.

For traditional instant games, the production of the game’s data is accomplished by software that executes on computer hardware and the result is a game data file that represents the entire game. The game data file may be subdivided into packs of tickets or simply tickets, but the subdivision is arbitrary and is useful in uniquely identifying each ticket, among other reasons. The subdivision is also useful so that players can purchase or otherwise obtain one or more tickets and play each ticket to determine if he has won a prize. The instant ticket game that is available to the players would also generally be subdivided into packs which could be further subdivided into tickets. Players would most generally purchase a single ticket or several tickets. In some cases, a player might choose to purchase an entire pack of tickets.

In other types of games (for example games that are played on the internet or on a mobile phone), the game data may not be subdivided into packs or tickets and the present disclosure does not depend on existence or non-existence of this subdivision. In addition, the data may not be stored in a file; rather the individual game symbols that comprise a particular ticket or comprise a particular play of a game may be generated real-time by software and presented to the player the moment after he chooses to play the game; or the moment after the player takes some action. It must be reiterated that the present disclosure is relevant to these games as well as games that are considered ‘pre-determined’, in which (by definition) a file of game data is created prior to the player purchasing a ticket.

Typically, RNGs, as known to those of skill in the art, are used by the software to determine which symbols appear on the tickets and therefore which tickets win or lose. An RNG can be based on a hardware device in which the device is designed to use some type of external stimuli to create an unpredictable mixture of numbers; or an RNG can be based on software, which would typically be referred to as a ‘pseudo random number generator’ (pRNG). In either case, the result of the RNG is an unpredictable and unbiased string of outputs, typically numbers. The present disclosure applies to both software and hardware based RNGs. The resulting string of unpredictable and unbiased numbers could be used by the game generation software to determine which tickets win and at what level they win or more generally, the resulting string of numbers could be used for any number of purposes known to those of skill in which random numbers determine the outcome of an event. Therefore, the output of a game's RNG is critical because it provides the basis for unpredictable and unbiased winners in the game. The output would also be critical in any of a number of systems or process whereby the RNGs output determines the course of events in a manner that is as unbiased and unpredictable as possible.

Integral to the operation of the RNG is the input to the RNG itself: known as a 'seed'. All random number generators require an input seed number or seed number set to initialize the random number generation algorithm. The RNG seed is typically an integer used to initialize the starting point for generating the series of random numbers produced by the RNG. The seed initializes the generator to a random starting point, and each unique seed returns a unique random number sequence. Typically, a seed number is introduced to the RNG which initializes the RNG and the resulting output is a sequence of unpredictable numbers that are further used by the game software for various purposes; and for this discussion, the output sequence of numbers is used to determine an unpredictable sequence of winning and losing tickets. However, the use of the RNG should not be considered limited to this one aspect. It can therefore be concluded that the security of the seeds used by the RNG is vital to the security of a game, namely the confidentiality and integrity of the mixture of winning and losing tickets.

Any one individual who might have unrestricted access to the game generation software as well as similar access to the game's RNG and seeds can use these components to produce the entire game and then illicitly determine which tickets or game plays win, along with their exact value without having to actually purchase a ticket or a game play. It is common in the instant ticket industry to separate the RNG seeds from the game software; or to encrypt the seeds; or to otherwise secure or segregate the seeds from the game software. These controls generally ensure that at least two persons would have to collaborate in order to create the actual and live game data. It is the intent of this disclosure to further secure and segregate the game's RNG seeds from the game software.

It must be noted that for these types of games, it is required by the lottery administration that the game software be able to reproduce the ticket data for a contractually specified period of time after the game has been delivered to the lottery administration. This is required because there may be disputes about the intended winning prize on a ticket or a ticket may be damaged or packs may be stolen from a retail location; or there may be disputes about a particular game play on the internet. In these and other cases, the lottery administration may require an exact reproduction of the ticket, which would be provided by the game provider system.

As part of the manufacturing process, the game provider images onto each paper ticket: game symbols (play indicia), ticket identification data (or inventory data) and ticket validation data. Game symbols are as described previously. Ticket identification data includes serial data which can include the game number, the pack number and the ticket number. This data sequentially numbers each pack and each ticket in the game. Validation data includes a unique validation number used to uniquely identify each ticket independently of the unique identification provided by the serial number. The validation number is usually an encrypted number that is used by a lottery administration system to determine if the ticket is a winner when it is redeemed by a player.

One method of producing instant ticket games is termed 'single pass security'. In this method, there is a defined relationship between the ticket identification data and the validation number imaged on each lottery ticket. This relationship may be algorithmic or may be a file or a set of files that relate the ticket identification data to the validation number. In "single pass security", there are discrete methods to determine the ticket's value based on either (1) the ticket identification data or (2) the validation number. For example, one could use the ticket identification data as an input to the game reconstruction software to determine the ticket's value. One could also use the ticket's validation number as input to determine the ticket's value.

Another method, termed 'Keyed Dual Security' or 'KDS', is an instant ticket programming and manufacturing process where there is no link between the ticket identification data and the ticket validation data. This disconnection results in a secure environment such that neither the game generation software (or the game reconstruction software) can reproduce valid information relating the ticket identification data to the value of the printed tickets.

One approach employed with respect to KDS is to employ a shuffling routine using a shuffle key that is created by the lottery administration and is unknown by the game provider. This shuffle key may be used as an input variable to independently shuffle the pack numbers in a pool after they are computer generated by the game generation software during game data production. In other words, the game provider's game generation software produces a set of packs containing inventory, play and validation data which is then re-shuffled in a separate process that is controlled by a confidential lottery shuffle key. The shuffle key is unknown to the game provider and in this manner, the lottery administration, via their key, controls the separate pack shuffling process that assigns the final value to each pack of tickets.

The result is a set of identification numbers imaged on the tickets that are now completely unknown to the game generation software and the game reconstruction software. In this approach, the lottery-generated shuffle keys are maintained within a specialized and secured server that is operated by an independent trusted third party who monitors the keyed dual security game data production activity on behalf of the lottery administration.

Since the game provider maintains control of the initial data generation and the lottery maintains control of the final re-shuffle, neither the lottery nor the game provider can know the value of a pack unless they cooperate. In this manner, the possibility of anyone on either the provider's or the lottery administration's staff of being able to illicitly identify winning lottery tickets by using ticket identification data imaged on the tickets is substantially reduced.

It is critical to note that Keyed Dual Security—the process in which there is a separate and second step of re-shuffling the game data after the initial generation of the data has significant disadvantages. For example, in an automated printing assembly, certain types of games must physically conform to or match a specific type of printing mechanism. For instance, lottery tickets of varying sizes or lottery tickets with different game themes or graphics, which may require for example special or specific inks, can only be printed by certain printing devices. If the pack number of the group of tickets is shuffled, not only is the game information related to the tickets intentionally obscured for security purposes, but the type and form of tickets present within the pack is obscured as well. Thus, packs of tickets that may have been required to print on a particular print channel or path on the printing press may be shunted, as part of the keyed dual security process, to a printing channel or path where the printing mechanism is unsuitable for printing that particular pack. Unusable or damaged tickets result, creating not only waste but also requiring that these packs of tickets and the corresponding information for same be removed from the lottery system data domains as the tickets were not actually generated and therefore cannot be distributed.

Also, the KDS system may also cause issues with reconstructing ticket information as some reconstruction methods require an exact image of the original ticket, and printing discrepancies caused by shuffling the pack numbers may interfere with the reconstruction.

What is needed is a security system in which there is no additional or second shuffle. Additionally, a security system is needed that provides an improved method for generating the final game which includes a single shuffle using a secret final game generation seed that is comprised of multiple key or seed fragments. Further, the security system in which each key fragment is securely combined to form a final game key or seed and the process of combining the key or seed fragments needs to be transparent such that all key or seed holders consent and are aware that their respective fragment is being used to form the final key or seed. What is further needed is a system that assures all parties that their respective secret key(s) or seeds are required to produce the final game generation key or seed, which is in turn used to construct the game data used for game entries.

SUMMARY OF THE INVENTION

Objects and advantages of the invention will be set forth in the following description, or may be obvious from the description, or may be learned through practice of the invention. It is intended that the invention include modifications and variations to the system and method embodiments described herein including combining embodiments to provide new embodiments.

In one embodiment, the current disclosure provides unique methods for securely generating a lottery game or generating data. In a particular embodiment, a final game generation seed is formed from multiple seeds from multiple and differing parties such that no one party has the ability to create the final seed without the other parties' consent or knowledge. Since the final seed is required by the software that governs the distribution of prizes within a game and is therefore required to produce valid game data, no one entity would have enough information to determine the location of a winning prize within the final game data file or the ticket population. Moreover, even though the present discussion may discuss a "ticket" population, this is not limited to simply print media as the present disclosure may be employed with respect to electronic media as well. Use of the current disclosure for gaming media, whether print or electronic, is desirable because it creates an environment of transparency such that all parties must agree on the terms that result in the formation of the final seed from the individual seed fragments in order to produce a game.

In one embodiment, a method is provided for securely generating a lottery game. At least two seed sets are established by a game provider and at least one other party. The value of each seed set is known to the party establishing the seed set and remains undisclosed to all other parties establishing seed sets. Then at least two seed sets are manipulated to generate a final seed. The final seed is used to generate game entries for the lottery game or other data.

In a further embodiment, a final seed is generated based on input from at least two other parties. In a still further embodiment, the final seed is deactivated after it is used to generate game entries for the lottery game. In a yet further embodiment, after the final seed is deactivated, the final seed and game entries can only be recreated by cooperation from all parties participating in generation of the final seed. In another embodiment, the final seed is securely maintained by a trusted third party. In yet another embodiment, the final seed is securely maintained by the game provider and all uses of the final seed are transparent to the trusted third party. In a yet still further embodiment, the generation of the game entries is audited to ensure that each party contributes to creation of the game entries. In a further embodiment, auditing is accomplished by employing at least one hash function during generation of the final seed. In a further embodiment, the game provider shared key or seed is transmitted to at least one other party. In a still further embodiment, multiple parties calculate the final seed. In another embodiment, the final seed is known only by the game provider.

In a further embodiment, a method is provided for cooperatively generating gaming data. At least a first seed set is created and at least a second seed set is received. A final seed is formed from at least the first and second seed sets. The final seed is used to generate gaming data. Transparency is provided in the process so that it can be determined what seed sets were used to generate the final seed set.

In a further embodiment, the final seed is known by at least one party creating one of the seed sets.

In a further embodiment, the final seed is generated based on input provided by at least three parties. In a still further embodiment, a processor performs at least one hash of the information used to form the final seed during the final seed formation process. In another embodiment, only a single party generates the final seed. In a still yet further embodiment, multiple parties generate the final seed. Still further, the game provider shared seed may be transmitted over a network to at least one other party to enable that party to generate the final seed. In another embodiment, the final seed is deactivated after being used to generate the data. In a yet further embodiment, after the final seed is deactivated, the final seed and game entry data may only be recreated by cooperation from all parties participating in generation of the final seed.

In an alternative embodiment, a verifiable method of generating secure data is disclosed. At least two seed sets are established by at least two parties. At least one other party's seed is received over a network. Then at least two seed sets are manipulated to form a final seed or seed set, all performed via a processor. The final seed generation process is audited via conducting at least one hash function of at least one of the received seed sets. The final seed is employed in a process to generate data.

Additional aspects of particular embodiments of the invention will be discussed below with reference to the appended figures.

BRIEF DESCRIPTION OF THE DRAWINGS

A full and enabling disclosure, including the best mode thereof, to one of ordinary skill in the art, is set forth more particularly in the remainder of the specification, including reference to the accompanying Figures, in which.

DETAILED DESCRIPTION

Figure 1:
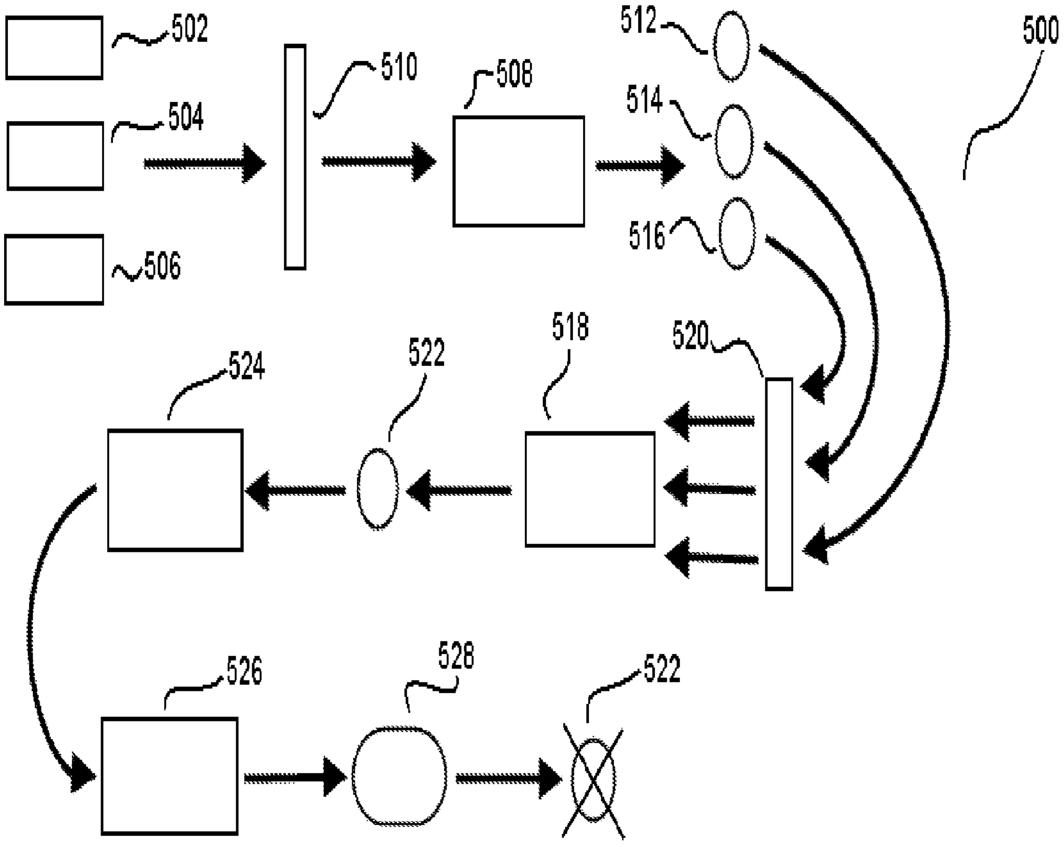
FIG. 1 is a schematic view of a preferred embodiment of the disclosure.

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to the present disclosure without departing from the scope or spirit of the disclosure. For instance, features illustrated or described as part of one embodiment, may be used in another embodiment to yield a still further embodiment. Thus, it is intended that the present disclosure cover such modifications and variations as come within the scope of the appended claims and their equivalents.

In general, the present disclosure is directed to methods for securing data or game generation data via generating a final key or seed, or final game generation key, with a deterministic approach that avoids any party in the game production/distribution chain from ever gaining access to any other party's secret key(s). This may occur in the form of fragmented key storage where the components necessary to produce the final key are stored across multiple parties. Therefore, compromising any one party's secret key would not necessarily compromise the final key used to generate the game. The methods disclosed herein may be employed for various types of data as well as physical or electronic game tickets.

The term 'key' or 'seed' in this application may mean a single cryptographic key used for encryption and decryption; or it may mean a file of numerical values used to seed a Random Number Generator or RNG. An RNG is a computational or physical device designed to generate a sequence of numbers that lack any pattern, i.e., appear random, and such devices are well known to those of skill in the art.

The use of a security protocol, one example being a cryptographic protocol, may lead to heightened game security. To the lay user, all data stored on a computer is considered "encrypted" as it is appears as a "jumble" of letters and numbers. However, experienced users with access to this "jumble" can use this data to determine the contents of a computer or server. Thus, data must be actually encrypted to protect it from inappropriate access and use. Encryption uses an encryption key, such as a string of generated numbers, a generated alphanumeric sequence or a generated symbol sequence, for purposes of example only and not intended to be limiting, a sequence generated by a random number generator, to "scramble" data before it is stored on a computer or server. Anyone accessing the data without the key will only see useless numbers as the key is required to unscramble the data.

Data may be encrypted via software based and/or hardware based encryption, both of which may be applied to the disclosure herein separately or jointly. Software-based encryption uses a computer's resources to encrypt data and perform other cryptographic operations. Software encryption may use the user's password as the encryption key that scrambles the data. Hardware-based encryption, meanwhile, may use a dedicated processor that is physically located on the encrypted drive, or located separately and accessed over a secured network, instead of the computer's processor. This encryption processor may also contain a random number generator to generate an encryption key. Thus, the information is transcribed into a different form that is unable to be read by anyone who does not have the encryption key.

One method of encryption that may be employed in the current disclosure is asymmetric encryption. Asymmetric encryption may be used to encrypt data by distributing a public key that can be used to encrypt information. Once the information is received, however, to decipher the encrypted code a private key is required. Access to this key is typically restricted. Thus, while data may be encrypted with the public key, it can only be read again by whomever has the private key.

Suitable encryption protocols include RSA, Transport Layer Security, Internet Key Exchange, IPsec, Kerberos, Point to Point Protocol, Cramer-Shoup cryptosystem, ElGamal encryption, DSA, MQV, FHMQV, IKE, elliptic curve techniques, such as Elliptic curve Diffie-Hellman, STS, Diffie-Hellman STS and Diffie-Hellman.

A cryptographic key is a piece of information (a parameter) that determines the functional output of a cryptographic algorithm or cipher. Without a key, the algorithm would produce no useful result. In encryption, a key specifies the particular transformation of plaintext into ciphertext, or vice versa during decryption. A key exchange or multiple key combination method allows two parties that have no prior knowledge of each other to jointly establish a shared secret key over an insecure communications channel, i.e., a protocol where a malignant eavesdropper can observe all key negotiations between at least two parties and still remain unable to deduce the final key.

In a particular embodiment of the disclosure, a final game generation seed number is formed from multiple seed numbers from multiple and differing parties such that no one party has the ability to create the final seed number without the other parties' consent or knowledge. Since the final seed number is required by the software that governs the distribution of prizes within a game and is therefore required to produce valid game data, no one entity would have enough information to determine the location of a winning prize within the game. This is desirable because it creates an environment of transparency such that all parties must agree on the terms that result in the formation of the final seed number from the individual seed number fragments in order to produce a game Referring to FIG. 1, in one preferred system embodiment 500, multiple parties 502, 504 and 506 access a portal, such as web portal 508 or other comparable platform as known to those of skill in the art. The number of parties accessing the portal is shown as three but more or less parties are also herein envisioned and the disclosure should not be considered limited to just three parties. The portal may be protected by a firewall 510 to provide security for web portal 508 to prevent unauthorized access to system software or data. The web portal 508 may be configured to create and encrypt seeds for each of the parties with access to web portal 508. The result of parties 502, 504 and 506 interfacing with web portal 508 is a series of seed sets 512, 514, and 516 that are known only to the respective creators of the seeds (parties 502, 504, and 506, respectively). These parties may supply information used to create the seeds as required by the seed generation process. For purposes of example only, the seeds may be established by the state of a computer system, such as the web portal 508, a cryptographically secure pseudorandom number generator, a hash algorithm, from a hardware random number generator, or via other means as known to those skilled in the art.

After seed sets 512, 514, and 516 are generated, they may be transferred to a location such as a secured server 518, or other suitable device as known to those of skill in the art. This transfer may also require the seed sets 512, 514, and 516 pass through a second firewall 520, although this is optional and not required. At the secured server 518, the seed sets 512, 514, and 516 may be combined to form a final seed 522. The seed sets 512, 514, and 516 may be combined via processes known to those of skill in the art such as. The algorithm used to combine the seeds may be a custom and proprietary algorithm developed specifically for the purpose of combining multiple seeds (or integers) into a single, final seed number. After final seed 522 has been generated, it is made available to a specialized seed server 524, or other suitable device as known to those of skill in the art, and stored therein. Final seed 522 may reside either at the secured server 518 or seed server 524, depending on the desired security scenario. Further, the secured server 518 and seed server 524 may either or both be administered by a trusted third party to ensure confidentiality of the information contained in the respective servers. Or the servers may be secured by the game provider. Once it is decided to generate a game, final seed 522 is provided to game engine 526. The final seed 522 may either be transmitted directly from the seed server 524 or seed server 524 may request the final seed 522 from the secured server 518. Game engine 526 may generate a data file 528 from the final seed 522 that contains the game play information for the desired game. Game data file 528 may be generated by the game engine 526 from final seed 522 via methods known to those of skill in the art. Typically this would be a custom application developed and used by the game provider; however it is possible that the game software and game engine would be commercially available software. In either case, an RNG executed by game software running within a game engine requires the use of a final seed to control the distribution of winning and losing tickets within the game.

In one aspect of the preferred embodiment, once the tickets have been formed and shipped, final seed 522 may be destroyed or "dissolved" such that only the seed sets 512, 514, and 516 remain in the system. Alternatively, the final seed 522 may be securely stored within systems maintained by the game provider or within systems maintained by a trusted third party, or there may be other methods that would be readily apparent to those of skill in the art. Thus, to recreate the final seed 522, the final seed sets 512, 514 and 516, which may be either in the possession of the parties that created the respective seed or one or more trusted third parties, are all needed to reform the final seed 522. In situations where final seed 522 is not destroyed or deactivated, then the final seed may be available to the game provider, or other party contributing to the generation of the final seed, under the supervision of a trusted third party or via another process, which can either manipulate the final seed 522, as described later, or via a physical process that maintains limited access to the final seed 522 or any deactivated seed, such that access to the final seed 522 is made known to the parties contributing to formation of the final seed 522. This assures transparency in that all parties' are aware that their respective seed fragments were used to reform the final seed 522 in the event that the final seed must be recreated.

Thus, the final seed 522 is created from input from parties 502, 504, 506 via seed numbers 512, 514, 516. Because the final seed 522 derives from seed sets 512, 514, 516, no party can recreate final seed 522 without the cooperation of the other parties to provide the remaining seed numbers necessary to create the final seed. Say, for instance, to reconstruct data relating to stolen or missing tickets from the game, one needs the final seed in order to recreate the game data. Based on the description herein, the reconstruction is only possible with the assistance, knowledge or permission of the creators of the seed numbers 512, 514, and 516.

A game provider, lottery administrator and other third parties may serve as parties 502, 504, and 506. Indeed, in some embodiments, a single party may provide more than one set of seeds for use in the creating the final seed 522. Further, a party may receive the seed sets of other parties or may transmit its seed set to a receiving party. Further, the party receiving the seed sets may or may not be the party that manipulates or combines the seed sets to arrive at a final seed set. For instance, in one embodiment, the game provider may receive the seeds from the other parties. These can be combined via various mathematical techniques, as explained above, to arrive at the final seed. Thus, at least one of the seed fragments would be used to produce the final seed. From the moment the final seed is formed it is available to the game provider to create data or otherwise manufacture the game. The final seed is "active" during the data generation process and manufacturing process. In an alternative embodiment, it may be possible to "reform" the seed at each step of the manufacturing process and deactivate or destroy the seed once it has been used as needed. In the preferred embodiment, the seed is 'deactivated' once the tickets leave the manufacturing center, or are made available for use in an electronic or internet based gaming system, such that any subsequent activity involving the use of the final seed requires the assistance, knowledge or permission of the original seed creators. This may be a process in which the original creators must give their explicit permission or it may be a process in which the parties are simply made aware that the final key has been accessed or used. Further, the final seed—in its deactivated state—may be stored or otherwise maintained by a single or multiple servers that are administered by the game provider or trusted third party. Thus, reactivation or recombination of the seeds will be clearly transparent to all parties and will produce the same final key, which in turn can be used to reform the previously created game data and results.

By securing the seed, it becomes much more difficult for someone to illicitly use the game generation software to produce or reproduce the data since the seed controls the process that produces the mixture of winners and losers. Without access to the final seed for a particular game, the software cannot produce the correct and actual mixture. The present disclosure may help to secure the confidentiality of the seeds used by the game software. Further, the integrity of the game is based on using the one and only seed (or set of seeds) used to produce the game data.

A primary purpose of the disclosure is to improve the security of the game data by improving the security of the seed. This is accomplished by creating methods and systems where no one person has the ability to create or manipulate the game's final seed without the consent or knowledge of multiple other parties.

For purposes of example only, in one embodiment, a lottery administration could create random seed 'A'. A lottery game provider could create random seed 'B'. These seeds may, or may not, be delivered to a trusted third party such that the lottery administration and the game provider are only aware of their particular seed number and would have no knowledge or mechanism to know the value of the other party's seed number. Alternatively, the seeds could be sent to the lottery administration or the lottery game provider for further manipulation. Furthermore, the seed numbers could be encrypted such that only a third party 'system' or 'server' could decrypt them. This ensures that neither the lottery administration nor the game provider nor the third party would have the ability to know the value of any seed number unless the seed number was initially created by them. Those skilled in the art would recognize and be aware of a number of different methods in which two or more parties may securely create a seed number, securely transmit that seed number to an independent trusted third party, and then place the seeds on the trusted third party system such that no one, other than the creator of the seed number, could determine the original clear-text value of the original seed number.

While a trusted third party or TTP may be used in conjunction with the disclosure, the present disclosure should not be considered so limited. In place of the TTP, which is typically a third party contracted with by the game provider or lottery administration to assist with securing facets of the gaming data generation process as known to those of skill in the art, either the game provider, lottery administrator, or other parties providing seeds used to generate the final seed could serve as the custodian for all seeds.

There are multiple ways that agreeing parties can create seed numbers or sets of seed numbers such that only the creator of the seed numbers or sets are the only ones who know the true value of the seed numbers. Those of skill in the art are aware of commercially available software or hardware devices to achieve this; or those of skill would have the means to develop custom software or modify commercially available software that would be capable of securely forming seed sets.

For example, the lottery administration's first game seed numbers could be encrypted with a lottery public key such that only the lottery's private key would have the ability to decrypt the encrypted game seed numbers created by lottery administration. The lottery's private key could be securely placed within a trusted third party system or otherwise maintained in a manner that assures the agreed-to transparency with respect to assessing and recreating game data. such that no one individual at the trusted third party organization—nor anyone else for that matter—would have the ability to access the lottery administration's private key and therefore no one individual would have the ability to decrypt the lottery's game seed numbers In this manner, multiple parties could create a first game seed, encrypt it with a public key and then transfer the encrypted first game seed to a secured server. The secured server would contain the corresponding private keys and thus only the secured server would have the ability to decrypt the various first game seeds. Those of skill in the art would be aware of alternate methods to conceal information from multiple parties.

Those of skill in the art could devise various methods that would protect the value of the individual sets of seeds created by the agreeing parties. These methods would all ensure that the value of the seed numbers created by each organization could not be determined by anyone except the creating organization. One method would be to keep each private key (the only key capable of decrypting the seed number set) encrypted within a secured server or within a trusted third party system. This would require a method to protect the private keys used to decrypt the seed number sets since anyone with unobstructed access to the private keys could decrypt each individual seed set. For purposes of example only and not intended to be limiting, the private key found on a systems storage disk could be encrypted by multiple passwords such that five different persons, although more or less persons are applicable to this disclosure, would enter a password and all five different passwords would be used to encrypt the private key. To decrypt the private key, a subset n of the five persons (or more generally n of m) would be required to enter their respective password. The decrypted private key could be securely held in the systems memory for use to decrypt the seed numbers as needed. On disk however, the private key would always be encrypted.

In another embodiment, a similar arrangement can be made for the game provider or any number of other parties who may be designated as seed holders. In each case, whether it is two or twenty seed holders, a set of seed numbers is created and is securely transferred to a secured server or third party system such that only the original creator knows the true value of the original set of seed numbers.

Thus, the present disclosure includes, at least, methods and systems to allow for the creation of multiple sets of seed numbers from multiple differing and independent parties, methods and systems to allow the secure transmission of the sets of seeds from each party to an independent and/or secured server, methods and systems to allow for the encryption of the seeds within the trusted server such that no single person can decrypt the seed numbers without detection, and methods and systems to allow for the decryption of the seeds within the trusted server.

In one embodiment, a method is disclosed that will use the multiple and individual seed sets to form a single or final seed number that can be used by an RNG. One method, but those of skill in the art would recognize that there are many methods, would be to use the individual seed numbers as input to an algorithm that returns a single seed number. The single seed number would then be known as the final seed number and would be used by the game RNG to produce the required unbiased and unpredictable sequence of numbers used in turn to produce the unbiased and unpredictable sequence of winning and losing tickets. For example, the multiple seed numbers produced by the individual parties could be simply added together; or could be encrypted; or any number of mathematical operations could be used to take multiple inputs and produce a single output in a manner that can be securely conducted and in a manner that is repeatable.

Further, the present disclosure should not be considered as limited to generating gaming data. Indeed, the present disclosure can be used to help generate data in a manner such that distinct, independent parties can verify that their respective input has been used to generate the final data. For instance, a secure system could be established wherein parties providing algorithms or other data manipulation tools that may be used to represent tangible items or other information, used for instance in securing documents, in the generation of finely crafted or tuned mechanisms, forming chemical ingredients, mixing complex ingredient formulations, or other applications known to those of skill in the art may verify that their input has contributed to the final data.

Additionally, any number of users can take part in an agreement by performing iterations of an agreement protocol, which may establish common values used for encryption, and exchanging intermediate data, which does not itself need to be kept secret. The users participate by performing iterations of the protocol where the common encryption key of one iteration becomes the starting point of the next iteration.

Security in the gaming, instant ticket manufacturing, whether print or electronic, and data generation industries is necessarily high in order to preserve the confidentiality and integrity of the games and data, guard against intrusions, as well as to guard against interlopers attempting to learn the location or disposition of winning tickets in order to intercept same or attempting to learn the contents of a data cache in order to profit therefrom. One embodiment of the present disclosure provides for allowing a game product provider and a lottery to confirm that their respective seeds were, in fact, used in order to produce a combined final seed without either the game provider or lottery having to reveal their respective seeds to the other party. Without this confirmation, the game provider system could simply create a final seed on its own, despite the existence of the multiple first game seed files. The multiple parties would have no mechanism to determine this and the game provider would have unobstructed use of the final game seed without the knowledge of the multiple parties.

Figure 2:
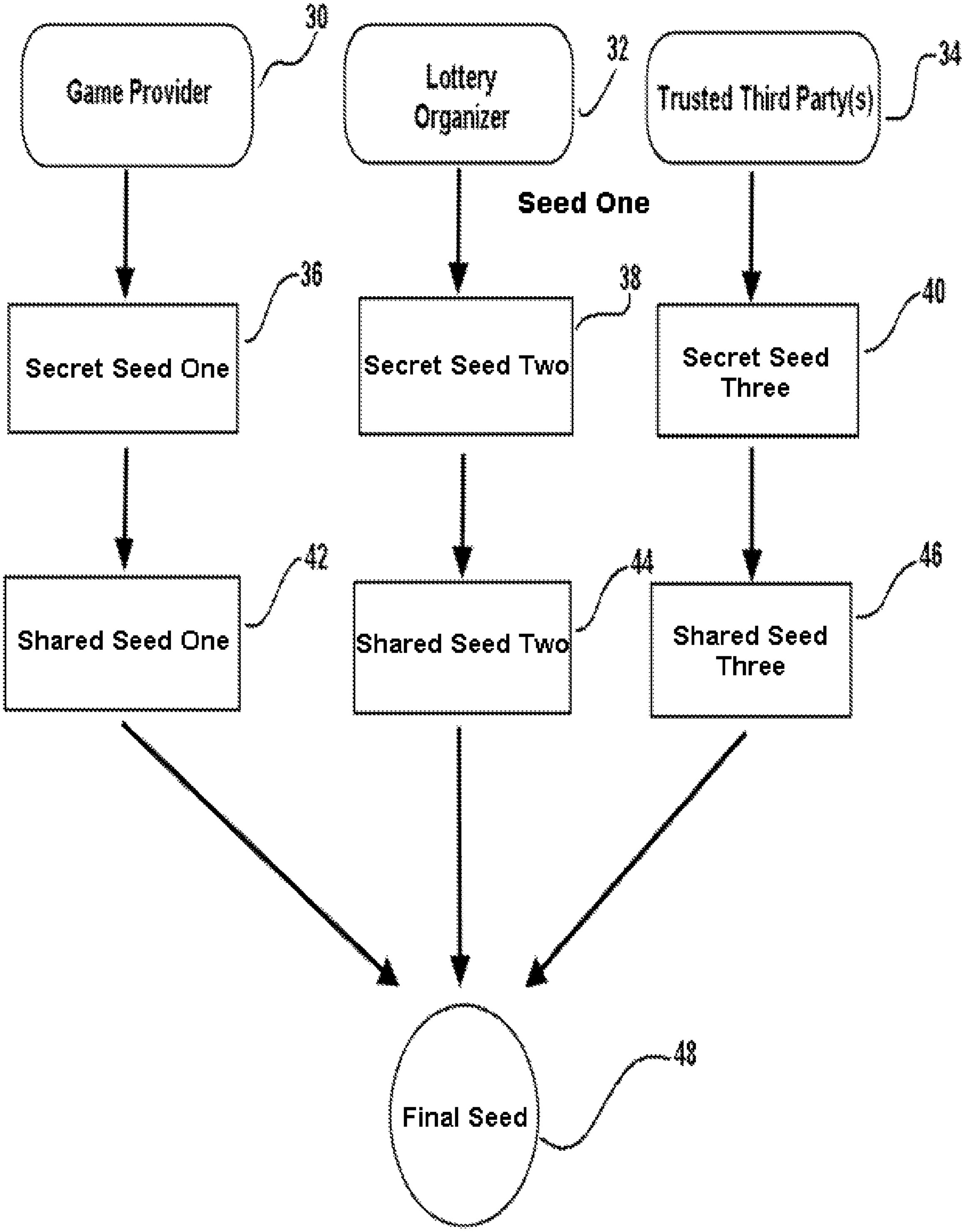
FIG. 2 illustrates a block-diagram of one embodiment of the disclosure wherein three parties cooperate to generate a final seed set.

As FIG. 2 illustrates, three parties, Game Provider 30, Lottery Organizer 32, and a Trusted Third Party 34 each possess a respective secret seed one 36, secret seed two 38, and secret seed three 40 as well as a shared seed one 42, shared seed two 44 and shared seed three 46. The shared seeds are combined in order to generate a final seed 48. It should be understood that the present disclosure is not limited to three parties but may involve more or less parties as the circumstances require. Nor should the disclosure be considered limited to just generating lottery games as various types of data generation may be protected and secured by the disclosure herein.

Figure 3:
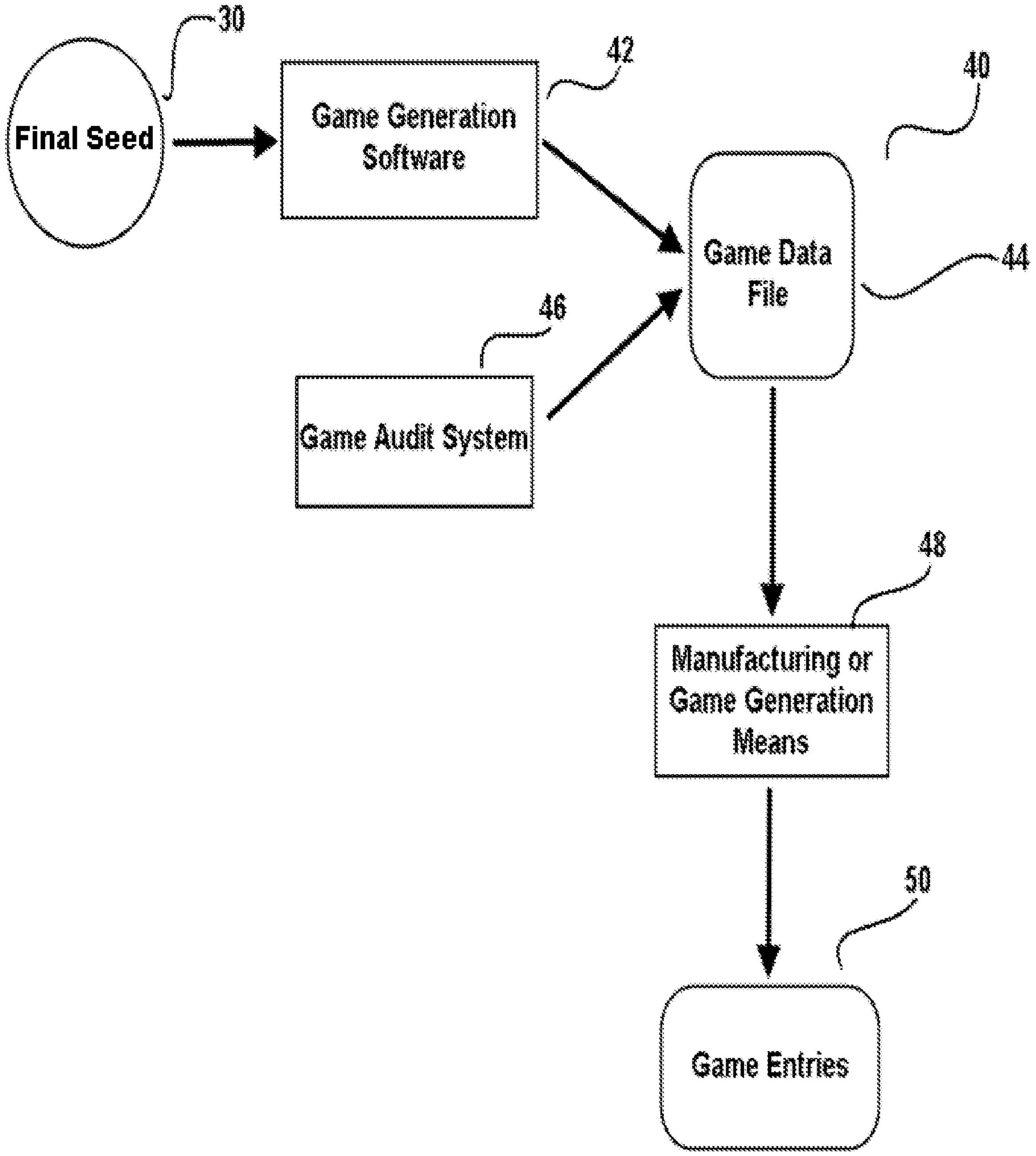
FIG. 3 illustrates one embodiment of the present disclosure wherein a final seed is used to generate a desired game.

In a further embodiment of the disclosure, FIG. 3 illustrates the final seed 30 being used to generate a desired game 40. Final seed 30 is input into game generation software 42, as known to those of skill in the art, to create a game data file 44 that contains the information used to create game entries 50. A game audit system 46, may be used in association with the game generation software 42 to ensure that the game entries 50 meet the requirements specified for the game 40. Once the game data file 44 is complete, the data is transmitted to a game production process. The game production process may be a ticket manufacturing process such that the game entries are used to create an instant ticket game and the tickets are sold to players at retail outlets. Or the game production process may be a process where game entries are transmitted to other systems—such as a server—such that the game entries are used to create a game that is sold to players via the internet or a game that can be sold and played by players on a mobile device. The present disclosure pertains to the creation of the game data and should not be limited by the final production or distribution mechanics.

Figure 4A:
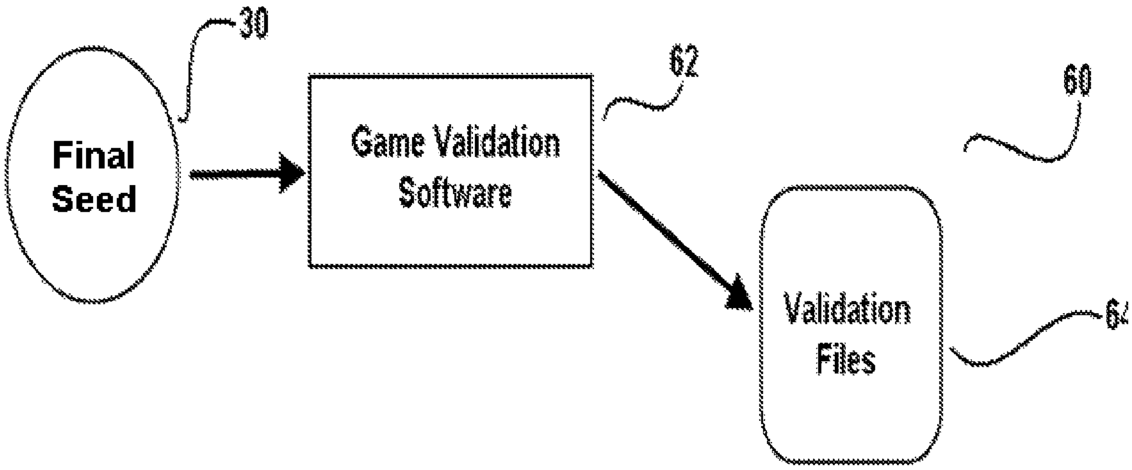
FIG. 4A shows a block diagram view of game validation software being used to generate validation files using a final seed.
Figure 4B:
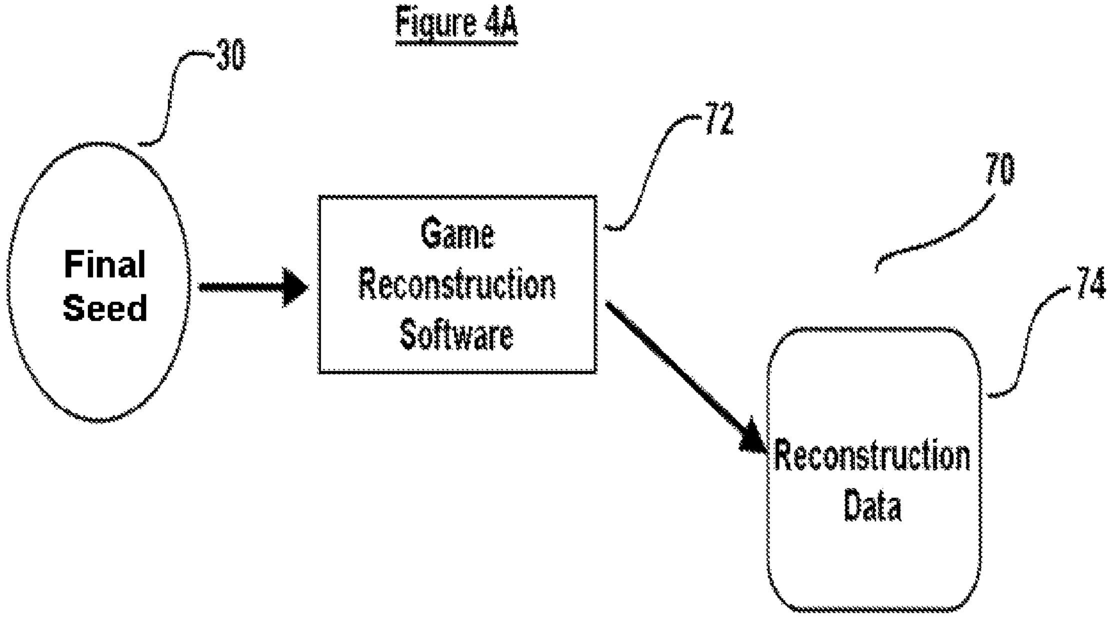
FIG. 4B shows a block diagram view of game reconstruction software being used to reconstruct the game using a final seed.

In another embodiment, as illustrated in FIG. 4A, the final seed 30 may be used to create the ticket validation file 60. The final seed 30 may be introduced to game validation software 62 to produce validation files 64 that may be used to verify the value of each ticket in the game 60. In a still further embodiment, as shown in FIG. 4B, the final seed 30 may be introduced to game reconstruction software 72 to produce reconstruction data 74 of a previously generated game 70. This allows for the recreation of tickets or game entries that are identical to the ones originally created in the game production process.

In a further embodiment, the combined seed created via use of the secret seed is deactivated after use. This results in enhanced security as no party may recreate the final seed without the consent of the other secret seed holders.

Figure 5:
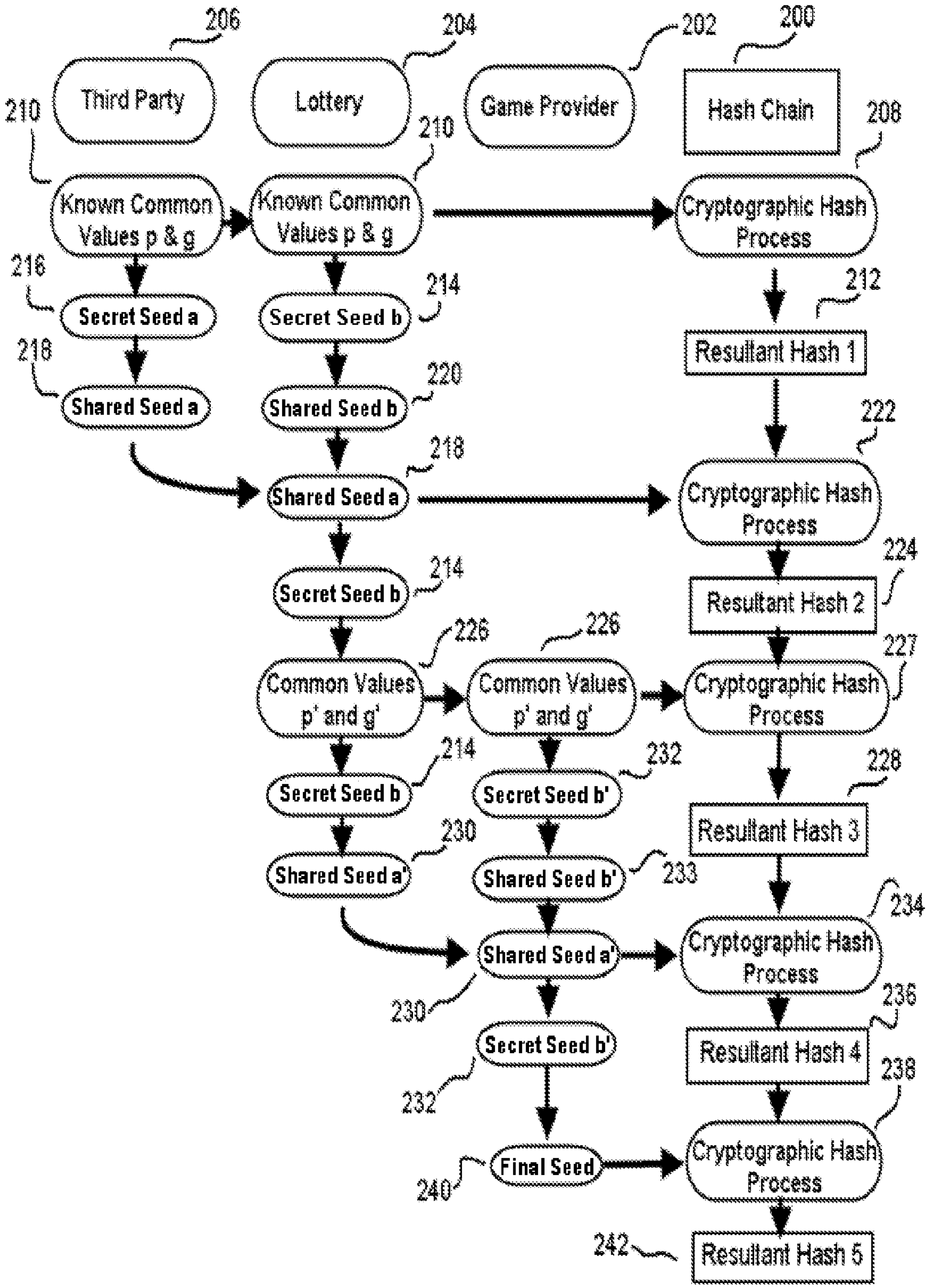
FIG. 5 shows a diagram wherein multiple parties contribute to the formation of a final seed known only by one party wherein hash functions are used to create an audit process to verify use of all the parties' secret seeds.
Figure 6:
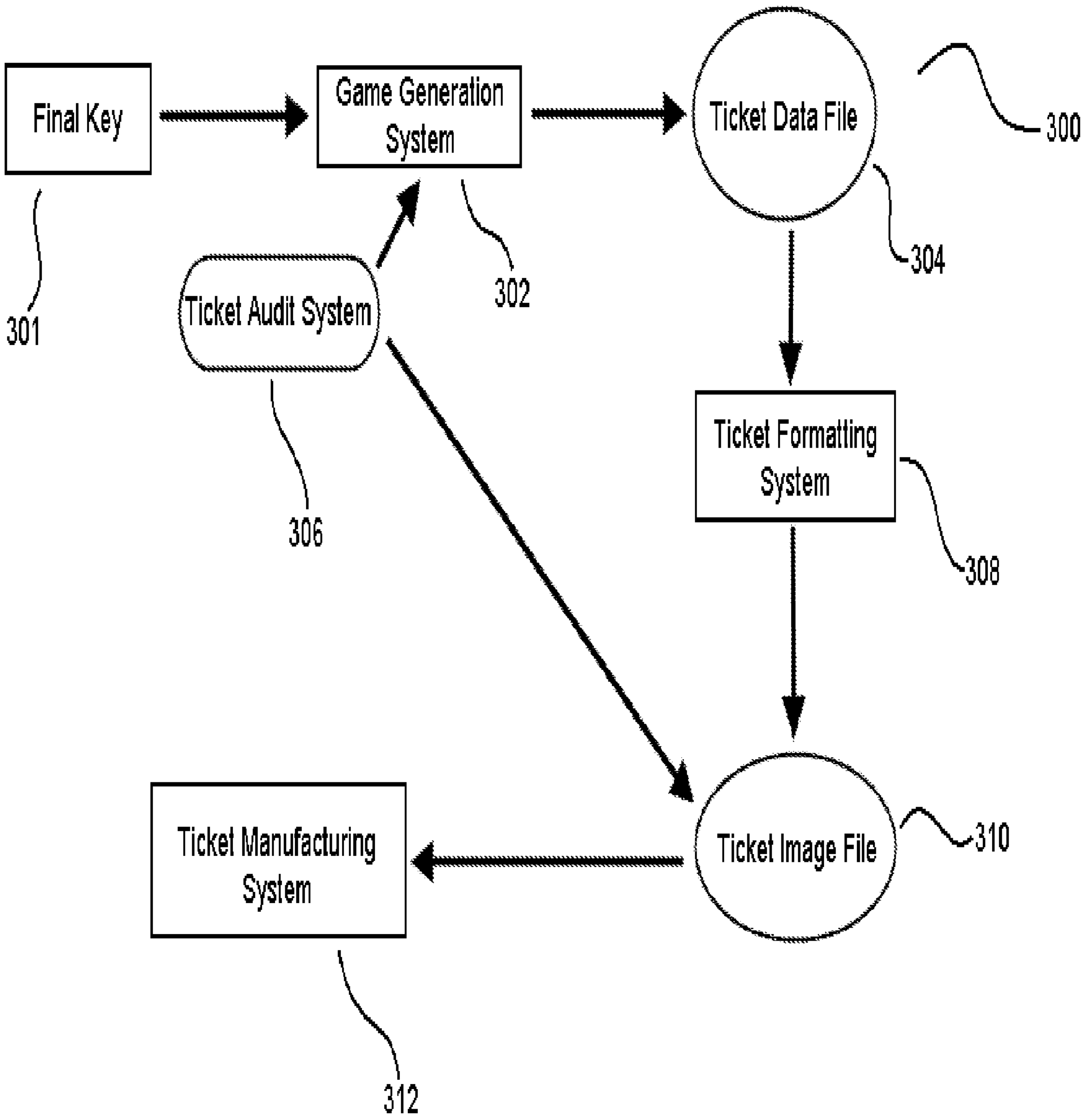
FIG. 6 displays a schematic of one embodiment of a game generation process.

As FIG. 5 illustrates, one possible embodiment of the present disclosure allows the game provider or data generating party to produce the last iteration of the seed. This situation is preferred in some situations as the game provider or data generating party ultimately has to have access to the final seed created by the security process in order to generate the data used to create the game the game provider provides to the lottery or data provided to the client. Moreover, because the algorithms disclosed herein are not typically processor or memory intensive, the final key may be created and used for the game generation process only utilizing process memory, e.g., Random Access Memory or RAM, in a specific computer at the game provider (not shown). In those situations where the final seed is deleted or otherwise deactivated after use, the only way to recreate the final seed would be to recreate the same interchange of information with the knowledge and cooperation of all parties.

Additionally, each party may desire proof that their individual seed was in fact utilized in the deterministic generation of the final key. Moreover, an auditing process, such as game audit system 46, may be used to verify that each iteration of seed use and game or data generation sequence was performed correctly. These auditing and verification processes may be accomplished by maintaining a hash chain through all iterations of the system.

A hash function is any algorithm or subroutine that maps large data sets of variable length, called keys, to smaller data sets of a fixed length. For example, a person's name, having a variable length, could be hashed to a single integer. That integer can then serve as an index to an array. The values returned by a hash function are called hash values, hash codes, hash sums, checksums or simply hashes. Suitable hashing methods are known to those of skill in the art and may include cryptographic hash functions. A cryptographic hash function is a hash function that can be defined as a deterministic procedure, i.e., procedures that always return the same result any time they are called with a specific set of input values, that takes an arbitrary block of data and returns a fixed-size bit string, the cryptographic hash value, such that an accidental or intentional change to the data will change the hash value. The data to be encoded is often called the "message," and the hash value is sometimes called the message digest or simply digest. Suitable hash algorithms include but are not limited to GOST, NAVAL, MD2, MD4, MD5, PANAMA, RadioGatun, RIPEMD, RIPEMD-128/256, RIPEMD-160/320, SHA-0, SHA-1, SHA-256/244, SHA-512/384, Tiger(2)-192/160/128, HAS-160, FSB, ECOH, LM hash, MDC-2, N-Hash, SWIFT, VSH, crypt(3) and WHIRLPOOL. With respect to the current disclosure a single hash may be used throughout the process or combinations of hashes may be used together to further strengthen security.

Figure 8:
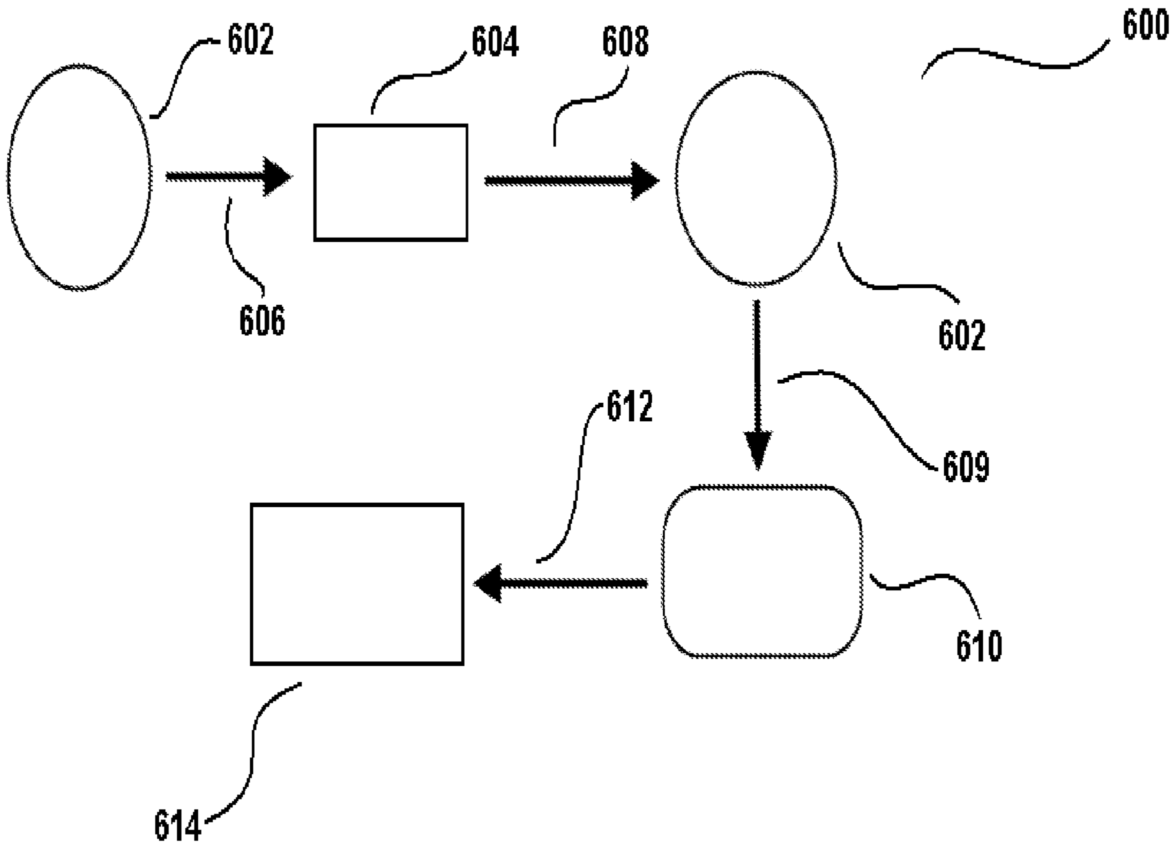
FIG. 8 illustrates one embodiment of a final seed deactivation/reactivation process.

As illustrated by FIG. 8, a hash chain 200 may be maintained throughout the iterations of the security process between game provider 202, lottery 204, and a third party 206. The hash may be performed via a computer, server, processor or other hardware known to those skilled in the art using hash or cryptographic hash software as also known to those of skill in the art by performing a cryptographic hash process 208, such as a cryptographic hash employing a secure hash algorithm, of the known values 210. For example known values 210 p & g are cryptographically hashed 208 to generate resultant hash 1 212. The hash value resultant hash 1 212 may then be saved and hashed 222 with the hash value of shared key a 218 to arrive at resultant hash 2 224. Resultant hash 2 224 may then be hashed with common values p' and g' 226 to produce resultant hash 3 228. This hash may then be saved and then hashed 234 with the hash value of shared key a' 230 to produce resultant hash 4 236. The hash value of resultant hash 4 236 may then be hashed 238 with final key 240 to produce resultant hash 5 242. All while the parties maintain their respective secret keys, secret key a 216, secret key b 220, and secret key b' 232, separate and unknown to the other parties.

By maintaining a hash chain 200 of the common values 210 and 226 (i.e., resultant hash 1 212 and resultant hash 2 224) and shared keys a 218, b 220, a'230 and b' 233 (i.e., resultant hash 2 224 and resultant hash 4 236) and the final key 240 (i.e., resultant hash 5 242) a record is maintained of each algorithmic iteration in the security process. During reconstruction of final key 240, the hash chain record of hash chain 200 would allow verification that each algorithmic iteration of the security sequence was correctly completed. The hash chain 200 may also be used to provide an audit method to each party (third party 206, lottery 204 and game provider 202) that their portion of the algorithmic security sequence was used for the production of the final key 240. As cryptographic hashes 208, 222, 227 and 234 may be employed for each iteration of the security process, each party may save their associated hash values without any breach in security. Additionally, each link of the hash chain 200 (e.g., resultant hashes 1-5) may be stored in plaintext in a header of a game generation file providing a ready audit reference. By reapplying their associated hash values to the proper position in the hash chain (e.g. the shared key a 218 hash value hashed 222 to resultant hash 1 212 to produce resultant hash 2 224), each party may be provided with additional verification that their respective secret keys (a 216, b 214, a' 230, and b'232) were used to create final key 240. While FIG. 8 illustrates three parties cooperating to form the final key, this disclosure is not so limited and less or more parties may be involved. Further, the order and nature of exchanges between the parties may also be varied such that the lottery, third party or game provider perform the activities indicated by the two other parties in FIG. 8. Additionally included in the preferred embodiment of the invention is a secure system that is designed to carry out the key exchange as well as hashing, or other audit, measures, if desired.

FIG. 9 displays a schematic of one embodiment of a game generation process 300 according to the present disclosure wherein final seed 301 is input into game generation system 302, wherein such game or data generation systems are known to those of skill in the art, in order to generate ticket data file 304. During this process, ticket audit system 306 may optionally be included in order to confirm that the ticket data file 304 was generated correctly. Ticket data file 304 is then introduced to ticket formatting system 308 in order to form the ticket image file 310. Ticket audit system 306, or a separate audit system (not shown), may also audit formation of the ticket image file 310 to confirm that this information is correct. Ticket image file 310 is then transmitted to the ticket manufacturing system 312 (or another game production process as described herein including electronic or non-print game generations or processes used in association with internet gaming) in order to generate tickets or game entries based on final key 300. Although reference is made to "ticket data" throughout the disclosure, this disclosure is not so limited and should be understood to apply to any type of data that may be generated from the disclosure explained herein. And although reference is made to ticket manufacturing throughout the disclosure, this disclosure is not so limited and should be understood to apply to varied game production processes.

Figure 7:
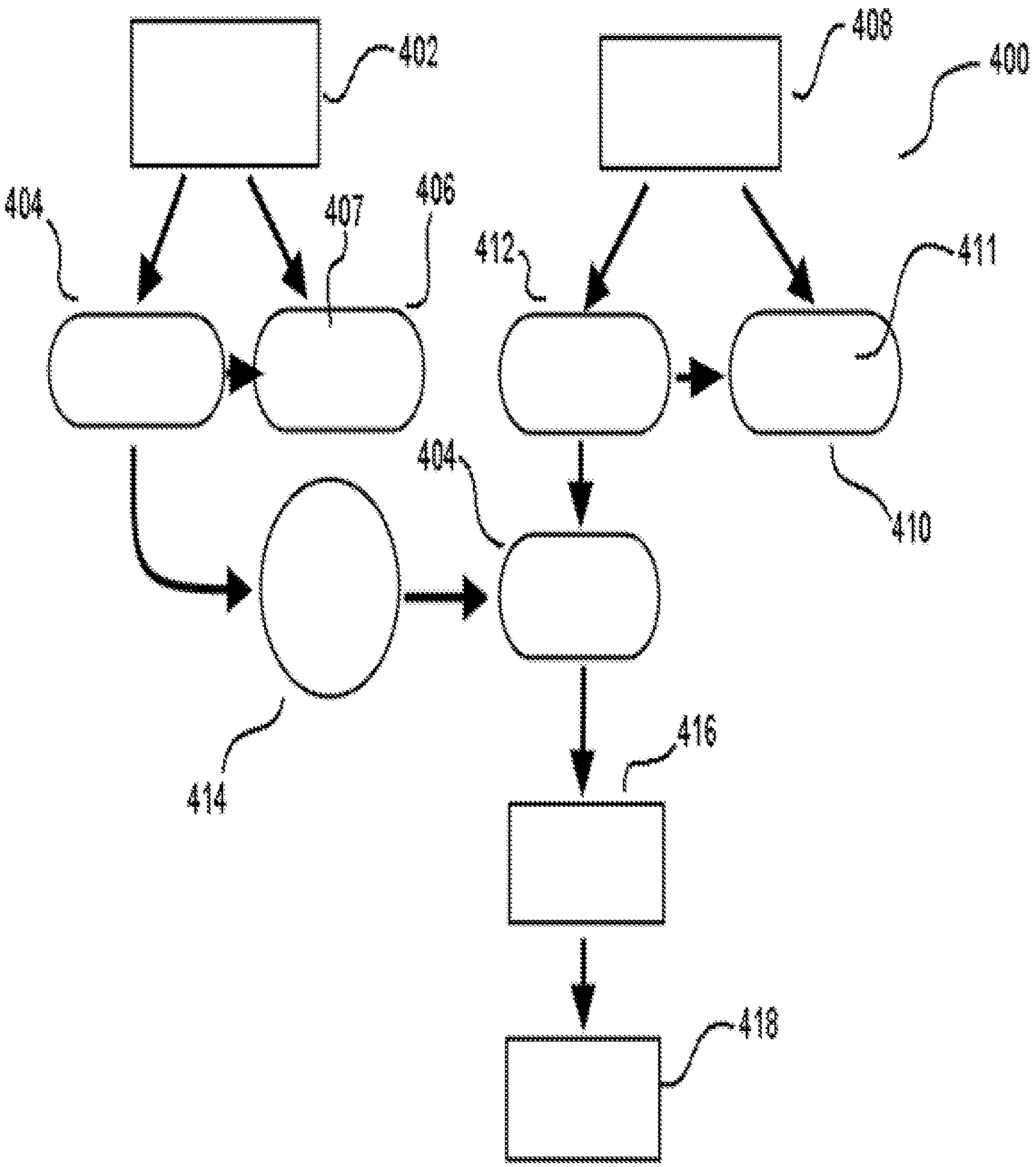
FIG. 7 illustrates one embodiment of a data transfer between a lottery and a game provider to generate a final seed.

FIG. 7 illustrates one embodiment of a data transfer 400 between a lottery and a game provider to generate a final key 414. Lottery processor 402 generates a shared seed 404 from a secret seed 406. Secret seed 406 may be retained in the processor 402 or in a computer 407, wherein computer 407 may also contain processor 402. Meanwhile, game provider processor 408 generates a shared seed 410 from a secret key 412. Secret key 412 may be retained in the processor 408 or in a computer 411, wherein computer 411 may also contain processor 408. Shared seed 404 is transmitted by the lottery via a network 414, as known to those of skill in the art, to the game provider. Game provider processor 408 then uses shared seed 404 and secret seed 412 to generate final seed 416. Processor 408 may subsequently erase final seed 414 once game data 418 has been created via means as known to those of skill in the art, such as generation by computer programs. While only two processors and two computers are illustrated, the disclosure is not so limited and additional processors and computers may be incorporated, especially if additional third parties provide input into the final seed generation. Additionally hardware such as servers, including virtual servers, may also be incorporated into the process. Moreover, multiple networks may also be used as more parties contribute to final key generation. For purposes of example only and not intended to be limiting, more networks may be used in embodiments where the game provider transmits a shared key to another party.

Referring now to FIG. 8, after the final seed has been used, it may be deactivated or destroyed. In one instance of a deactivation/reactivation process 600, final seed 602 is used to generate data 604 via process 606 as known to those of skill in the art. Once the data generation is completed, shown at 608, final seed 602 is deactivated to form deactivated final seed 610. Final seed 602 may be deactivated, 609, in such a way as to render it unusable, either permanently or temporarily, by the party creating the data, regardless if the data is gaming related or otherwise. Thus, when deactivated, deactivated seed 610 would need to be reactivated, 612, in order to produce regenerated data 614 via deactivated key 610.

One possible way to deactivate final seed 602 to form deactivated final seed 610 is logical deactivation. As known to those of skill in the art, logical deactivation may include using mathematical or programming commands with respect to the final seed 602. These commands may ultimately dictate that the seed is no longer capable of being employed to generate data permanently or unless some form of conditional access is granted to enable use of deactivated final seed 610. For instance, deactivated seed could be deactivated via a series of programming commands, not shown. These commands render deactivated seed 610 inert. In order to use deactivated seed 610 to form regenerated data 614, new programming commands could be used to enable manipulation of deactivated seed 610 to form data 614.

Deactivation 609 of final seed 602 may also be accomplished by physical means to create deactivated final seed 610. In one instance, the final key 602 may be deactivated by copying or otherwise transferring it to a memory medium to produce deactivated final seed 610. The memory medium is then physically secured, which can be by a TTP, the entity that generated data 604, or via any arrangement agreed to by those contributing to formation of the final key 602, so that reactivation 612, by releasing the memory medium from the secured location, only occurs upon making the parties contributing to that final key aware that access has occurred. Thus, while no alteration has been made to the mathematical formulae, programming or coding that may comprise final seed 602, deactivated final seed 610 is still generated such that its use is only possible to reactivate 612 deactivated final seed 610 by providing transparency to the parties forming the seed that access to the deactivated final seed 610 has been granted to one of the parties.

While the subject matter has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

What is claimed is:

1. A method for securely generating one or more game entries for a lottery game, the method comprising:

establishing, by one or more processors, a seed set of at least two seeds by a plurality of sources, wherein a first seed of the seed set is established by a first source of the plurality of sources, the first source including a lottery game provider, and a second seed of the seed set is established by a second source of the plurality of sources, the second source including a party that is not the lottery game provider, and wherein a value of the first seed is only known by the first source and remains undisclosed to the second source, and a value of the second seed is only known by the second source and remains undisclosed to the first source;

manipulating, by the one or more processors, the at least two seeds by one or more computer-based algorithms to generate a single final seed; and using, by the one or more processors, the single final seed to generate the one or more game entries for the lottery game, wherein transparency is provided by the plurality of sources that were used to generate the single final seed agreeing on generation of the single final seed such that no one source can determine another source's seed and the single final seed cannot be created or recreated without all of the seeds from the seed set.

2. The method of claim 1, wherein the using, by the one or more processors, the single final seed to generate the one or more game entries for the lottery game further uses input from a third source of the plurality of sources to generate the one or more game entries for the lottery game.

3. The method of claim 1, further comprising:

deactivating, by the one or more processors, the single final seed after the single final seed has been used to generate the one or more game entries for the lottery game.

4. The method of claim 3, wherein after the single final seed is deactivated, the single final seed and the one or more game entries can only be recreated by cooperation from each of the plurality of sources that established the seeds in the seed set used to generate the single final seed.

5. The method of claim 1, further comprising:

storing, by the one or more processors, the single final seed after the single final seed has been used to generate the one or more game entries for the lottery game.

6. The method of claim 1, further comprising:

auditing, by the one or more processors, the generation of the one or more game entries to ensure that each of the plurality of sources contributes to generation of the one or more game entries.

7. The method of claim 6, wherein the auditing is accomplished by employing at least one hash function during generation of the single final seed.

8. The method of claim 1, further comprising:

transmitting, by the one or more processors, the first seed established by the first source to at least one other source of the plurality of sources.

9. The method of claim 1, wherein the single final seed is known only to one of the plurality of sources.

10. The method of claim 1, wherein the single final seed is known by at least two of the plurality of sources.

11. A method for securely generating one or more game entries for a lottery game, the method comprising:

creating, by one or more processors, a first seed, wherein the first seed is created by a first source of a plurality of sources, the first source including a lottery game provider;

creating, by the one or more processors, a second seed, wherein the second seed is created by a second source of the plurality of sources, the second source including a party that is not the lottery game provider;

forming, by the one or more processors, a single final seed using one or more computer-based algorithms to combine at least the first seed and the second seed; and using, by the one or more processors, the single final seed to generate the one or more game entries for the lottery game, wherein transparency is provided during generation of the single final seed by not revealing a value of the first seed to the second source or a value of the second seed to the first source.

12. The method of claim 11, wherein the single final seed is known by at least one of the first source and the second source.

13. The method of claim 11, further comprising:

creating, by the one or more processors, a third seed, wherein the third seed is created by a third source of the plurality of sources, wherein the forming of the single final seed using the one or more computer-based algorithms further uses the third seed set.

14. The method of claim 11, wherein the forming uses at least one hash function during generation of the single final seed.

15. The method of claim 11, wherein the generation of the single final seed uses at least three seeds created by at least three of the plurality of sources including the first seed set created by the first source, the second seed set created by the second source, and a third seed set created by a third source of the plurality of sources.

16. The method of claim 11, wherein the single final seed is deactivated after being used to generate the one or more game entries.

17. The method of claim 16, wherein after the single final seed is deactivated, the one or more game entries may only be recreated by cooperation from each of the plurality of sources that created the seeds used to generate the single final seed.

18. A verifiable method for securely generating one or more game entries for a lottery game, the verifiable method comprising:

establishing, by one or more processors, a seed set of at least two seeds by a plurality of sources, wherein a first seed of the seed set is established by a first source of the plurality of sources, the first source including a lottery game provider, and a second seed of the seed set is established by second source of the plurality of sources, the second source including a party that is not the lottery game provider, wherein a value of the first seed is only known by the first source, remaining undisclosed to the second source, and a value of the second seed is only known by the second source, remaining undisclosed to the first source, and wherein at least one of the first seed and the second seed is received at the one or more processors via a network communication;

manipulating, by the one or more processors, the seed set by one or more computer-based algorithms to generate a single final seed;

auditing, by the one or more processors, the generation of the single final seed by performing at least one hash function on at least the first seed and the second seed; and using, by the one or more processors, the single final seed to generate the one or more game entries for the lottery game.

* * * * *